INVENTOR.
NURI KOHEN

INVENTOR.
NURI KOHEN

Feb. 24, 1970   N. KOHEN   3,497,395
VENTING VALVE ASSEMBLY
Filed Sept. 21, 1967   3 Sheets-Sheet 3
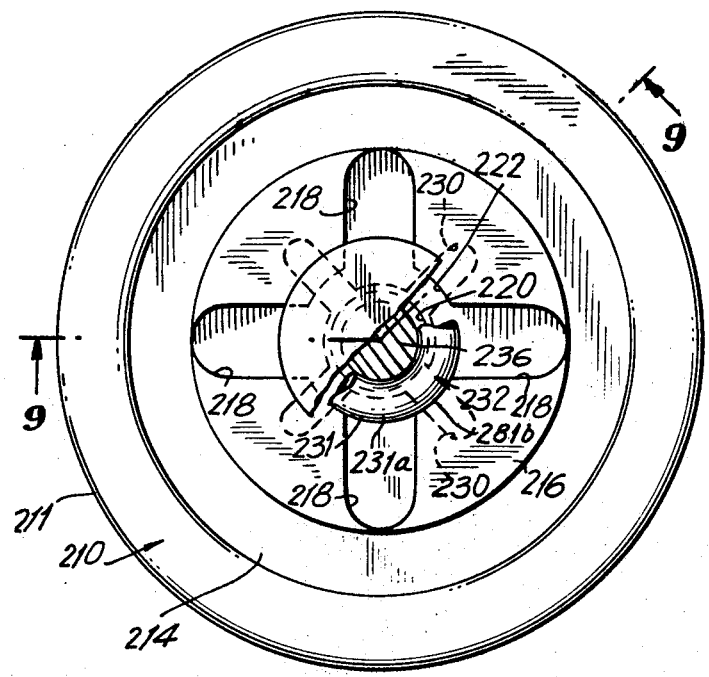
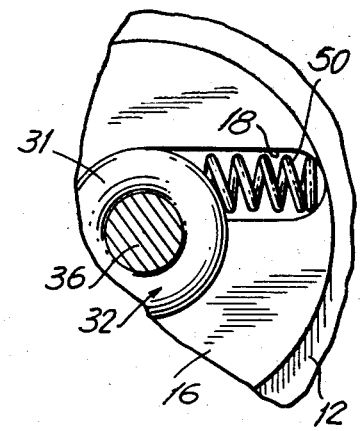
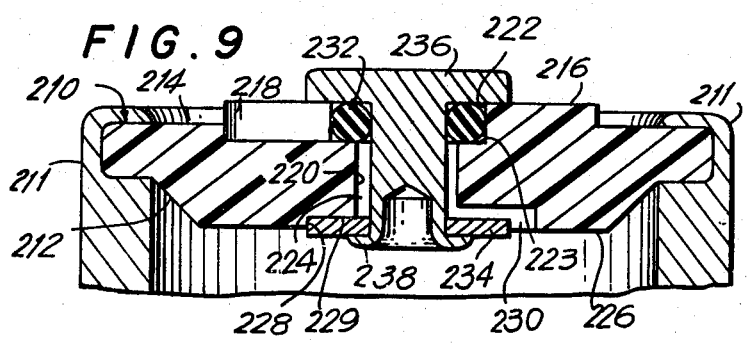
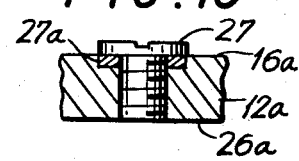
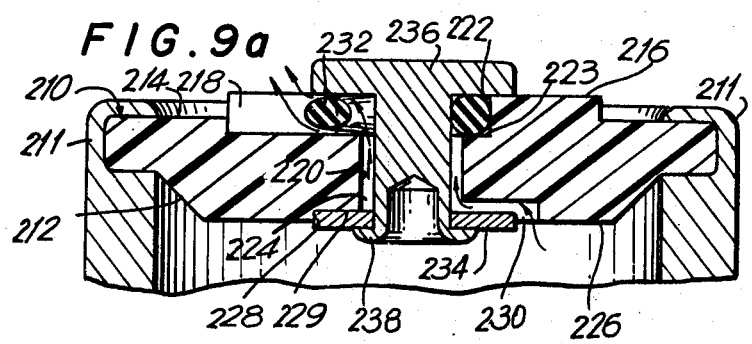
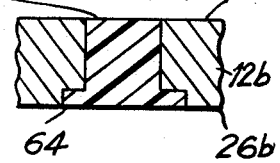
INVENTOR.
NURI KOHEN though United States Patent Office 3,497,395
Patented Feb. 24, 1970

3,497,395
VENTING VALVE ASSEMBLY
Nuri Kohen, Jackson Heights, N.Y., assignor to Yardney International Corp., New York, N.Y., a corporation of New York
Continuation-in-part of application Ser. No. 614,139, Feb. 6, 1967. This application Sept. 21, 1967, Ser. No. 669,631
Int. Cl. H01m 1/08, 1/06
U.S. Cl. 136—178                        7 Claims

ABSTRACT OF THE DISCLOSURE

A venting valve for a galvanic cell wherein pressure from gases evolved by the cell processes are automatically released at a predetermined pressure level and thereafter the valve reseals automatically when the pressure is reduced to a lower predetermined pressure level. A preferred form comprises a resilient ring seated in a rectangular or inclined recess arranged to deform the resilient ring at excessive predetermined pressures to provide exhaust passageways by such deformation. Grooves of various shapes may be arranged to accentuate the deformation of the resilient ring and springs may be arranged in combination with the resilient ring for further regulation.

BACKGROUND OF THE INVENTION

The application is a continuation-in-part of my co-pending application Ser. No. 614,139 filed Feb. 6, 1967 which is now abandoned.

This invention relates to improvements in venting valves for electric batteries and other devices.

In the use of galvanic cells or batteries and the like, especially those of the rechargeable types, several problems have arisen for which the present invention provides solutions. Thus, where the electric cells are used as power sources for various appliances, such as radio or television sets, transceiver sending and receiving sets, electric shavers, electric drills and the like, it has been found desirable and in fact necessary to seal the cells to prevent leakage or evaporation of the electrolyte as well as to prevent entry of atmospheric carbon dioxide into the cells which would otherwise contaminate certain electrolytes by carbonation.

In recent years wide use has been made of alkaline galvanic cells utilizing nickel-cadmium, silver-zinc and other, electrode couples which are easily recharged. However, the processes of charging, overdischarging, or overcharging at excess currents cause production of gases inside the batteries and in the absence of corrective measures, the resultant gas pressures may rupture the cell.

SUMMARY OF THE INVENTION

The present invention provides valve means for automatically venting such gases when their pressure exceeds a predetermined level. The principal advantages of the invention are simplicity, adjustability, and the fact that the valve is opened and closed automatically and with expansion and contraction of the valve element so minute as to be practically imperceptible to the eye.

According to a preferred form of my invention, I provide a closure wall or cap member which is shaped to fit securely into or upon the top of the cell, the cap member having an opening formed therethrough. A conductive terminal has its shank extending through the opening but is of lesser diameter so as to afford gas-leakage channels or passageways around it. A deformable packing or sealing gasket member is placed around the terminal shank extending therethrough, and normally acts to seal against gas leakage therepast. However, venting grooves are provided adjacent to the gasket member so that excess gas pressure acting on the gasket member expands it partly into the venting grooves, and at the same time the slight stretching of the expanded gasket member reduces its cross-sectional area, providing a leakage path to vent gas under excessive pressure. When the pressure reduces to a low, safe value and consequently, the effective force acting on the gasket decreases proportionately, the gasket member contracts to its original shape, thereby again sealing the vents.

An object of the invention is to provide a novel and improved venting valve for a galvanic cell or the like which includes O-ring means for venting the same to relieve excessive gas pressure in the cell.

A further object of the invention is to provide a novel and improved combination battery closure and terminal having a normally sealed gas-venting valve, for protecting against damage due to excess gas-pressure buildup, the combination device being simple in design and made up of only a few rugged parts which are readily capable of quick assembly by relatively unskilled labor and by mass-production methods.

Another object of the invention is to provide a novel and improved self-venting battery closure gas valve and contact terminal which normally retains the battery sealed for interior battery pressures of certain valves and opens automatically under a predetermined level of excess evolved gas pressure for venting the same, the construction being such as not to require alteration of the usual dimensions, weight or configuration of any battery in which it is used.

BRIEF DESCRIPTION OF THE DRAWINGS

These and other objects and advantages of the invention will become apparent from the following detailed description of preferred embodiments of the invention, as illustrated in the accompanying drawings forming a part hereof wherein like reference numerals refer to identical parts throughout the several views.

In the drawings:

FIG. 6 is a fragmentary plan view showing another modified form of the embodiment of FIG. 1;

FIG. 7 is a fragmentary sectional elevational view somewhat similar to FIG. 3 but showing a modified form with a tapered head;

FIG. 8 is a top plan view of a further embodiment of the present invention;

FIG. 9 is a sectional elevational view taken substantially on the line 9—9 of FIG. 8 depicting the low gas pressure condition;

FIG. 9a is a sectional elevational view similar to that of FIG. 9 but depicting the high gas pressure condition;

FIG. 10 is a fragmentary sectional elevational view showing, by way of further modification, a portion of a cell cover with a filling plug; and FIG. 11 is a fragmentary sectional elevational view showing another modification of a portion of a cell cover with a self-sealing penetrable insert member.

DESCRIPTION OF THE PREFERRED EMBODIMENTS

Figure 1:
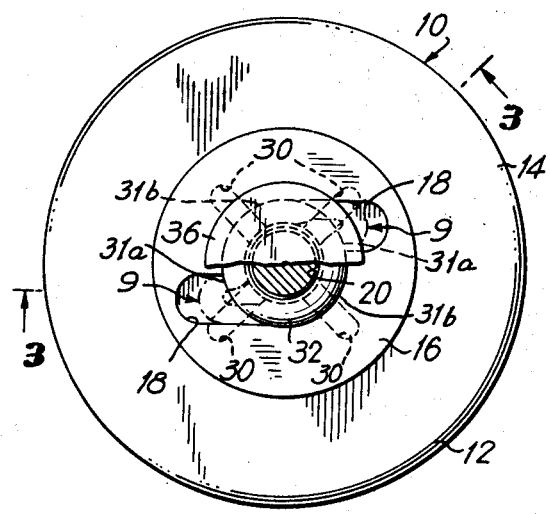
FIG. 1 is a top plan view of a combination battery closure, terminal and automatic gas-venting valve, the view being partly sectioned and broken out for clarity of illustration.
Figure 2:
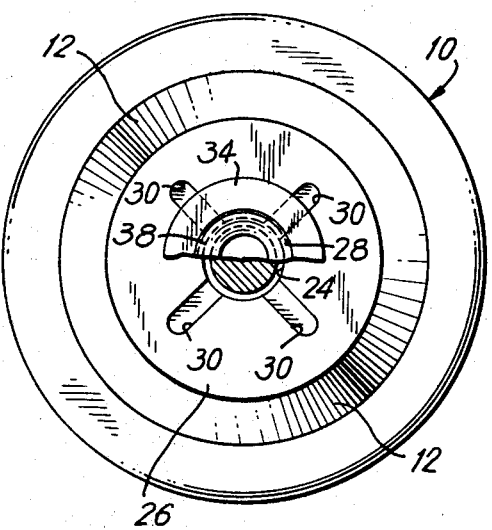
FIG. 2 is a bottom plan view of the device shown in FIG. 1, the view being partly sectioned and broken out for clarity of illustration.
Figure 3:
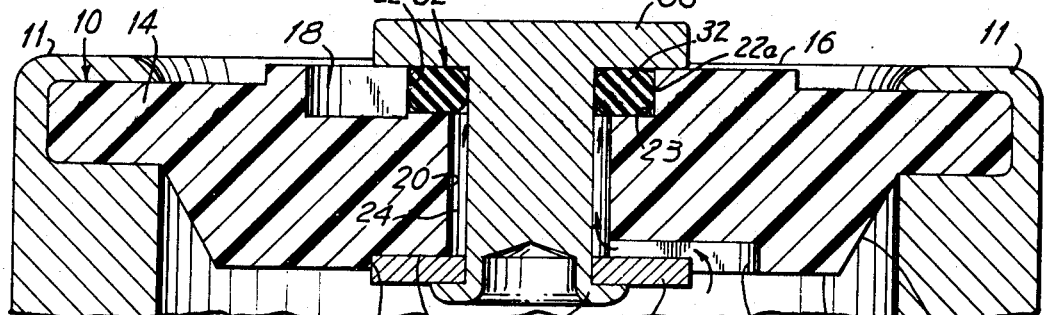
FIG. 3 is a sectional elevational view taken substantially on the line 3—3 of FIG. 1 depicting the low gas pressure condition.

Referring to FIGS. 1–3, the venting valve assembly 10 for a galvanic cell or the like comprises a generally circular ring 12 defining a central bore 20 and formed of any suitable material having insulating properties, such as plastic (nylon), hard rubber, or other material which is not affected by the electrolyte or any reaction products encountered therein. While the drawing shows the assembly 10 as circular in plan, it is understood that it may be shaped otherwise depending upon the battery case to which it is fitted. It should be noted that the illustrations are on an enlarged scale for clarity, and any desired size and thickness may be used.

Ring 12 has its upper outer surface 14 relatively flat and its central portion raised as a platform 16. As seen best in FIGS. 1 and 3, a pair of upwardly open venting and expansion grooves 18 in communication with the ambient atmosphere are formed in the platform 16 and extend tangentially outwardly from the central bore 20 of the ring 12. It is understood that the number of tangential grooves are not restricted to two in number but that any number of grooves 18 may be employed depending on the relative dimensions of O-ring 32. If desired, the grooves 18 can be extended to open through the perimeter of the platform 16. An annular groove or recess 22 is provided in the upper surface of the shoulder 16 and constitutes a step or shoulder in the bore 20 to serve as a seat 23 for a sealing member to be described.

As seen in FIGS. 2 and 3, the peripheral undersurface of the ring 12 may be thinned out to facilitate its mounting on a battery case 11, in any known manner. The central bore or opening 20 is formed with an inside diameter sufficient to receive freely the shank of an electrically conductive contact or terminal member 36, so that there is some clearance or free space therebetween, thus forming a gas passageway 24. The terminal member 36 may be in the form of a metallic rivet, the head of which is seated upon the center of platform 16 so as to overlie only the inner portions of vent grooves 18.

As best shown in FIG. 3, a sealing member 32, preferably an O-ring of natural or synthetic rubber or other resilient material, is seated in the annular groove or recess 22 upon seat surface 23. The tangential vent grooves 18 open inwardly into the annular groove 22, and are normally disconnected by O-ring 32 from passageway 24. In order to provide a gas-tight seal, the dimensions of the O-ring 32 are such as to produce a tight compression when the terminal 36 is mounted in the bore 20 as will be described. Accordingly, O-ring 32 is selected to have a thickness slightly larger than the depth of the recess 22 and an inner peripheral diameter substantially equal to the diameter of the shank portion of the terminal 36. When terminal 36 is fully seated and mounted over O-ring 32, O-ring 32 will be compressed by approximately 15% to effect a gas-tight and electrolyte leakage seal over the annular opening at the upper end of the passageway 24 while its segments 31a confronting the grooves 18 effectively block these grooves. As shown in FIG. 3, the relatively tight compression of ring 32 causes ring 32 to deform from its unstressed substantially circular cross-section.

A retaining washer 34 is placed over the lower end of the shank of the terminal 36, the lower end of bore 20 being slightly recessed into ring 12 at 28 to receive and center washer 34. The lower end of terminal 36 is then peened over or flattened, as at 38, for firm secure engagement in the cover 12.

In order to permit free entry of evolved gases from the cell to the annular leakage passageway 24, radial vent grooves 30 are formed in the bottom surface 26 of the cover 12, extending outwardly from bore 20 beyond washer 24. Gases can thus travel freely as indicated by the arrows in FIG. 3, up to the lower surface of O-ring 32 which seals the cell against leakage at pressures below a predetermined level as above-described.

Figure 4A:
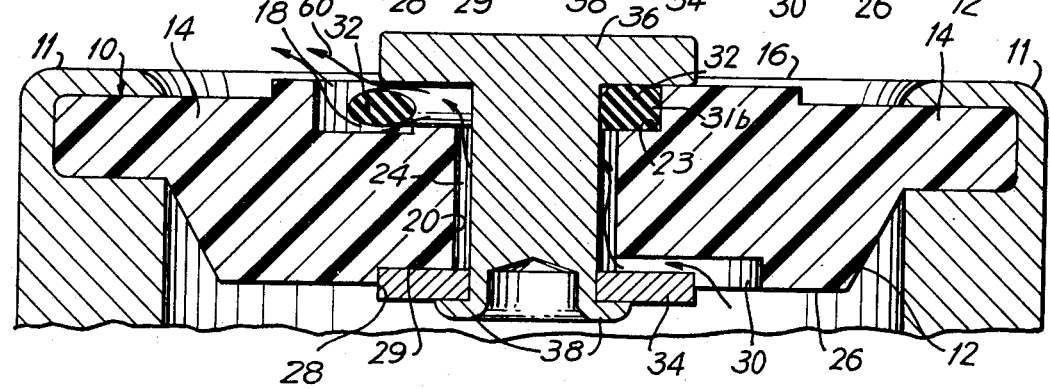
FIG. 4a is a sectional elevational view taken substantially on the line 4a—4a of FIG. 4.
Figure 4:
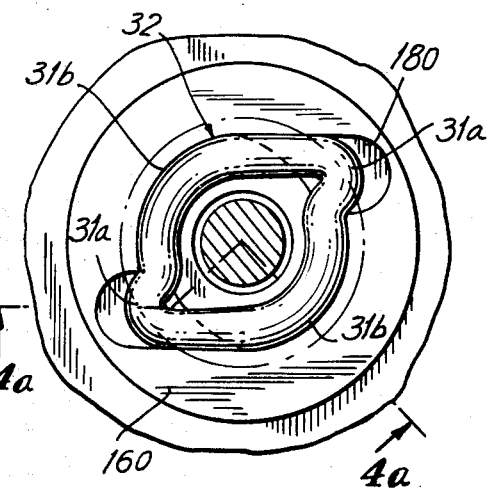
FIG. 4 is a fragmentary plan view of the embodiment of FIG. 1 depicting the high gas pressure condition.

However, as gas pressure in the galvanic cell 11 increases beyond a certain level, the gas pressure acts upon O-ring 32 and deforms its portions 31a which are thus gradually forced into tangential grooves 18, while the remaining portions 31b are constrained by annular recess wall 22a in their undistorted position. As shown in FIGS. 4 and 4a, and by dotted outline 9 in FIG. 1 as portions 31a of O-ring 32 expand into the vent grooves 18 bending away from the shank of the terminal 36, their cross-sectional diameter or thickness is reduced by stretching so that portions 31a no longer form a seal. Hence, gas is allowed to leak past and around the displaced O-ring portions 31a, into the vent grooves 18 thence out into the atmosphere as indicated by the arrows 60 in FIG. 4a. The bulging of ring segments 31 into grooves 18 is facilitated by the fact that, as clearly seen in FIG. 1, the thickness of O-ring 32 is considerably less than the width of the grooves 18. FIG. 3 shows that the depth of the grooves substantially corresponds to the thickness of the O-ring.

When the venting of excess gas has reduced the cell pressure to another but predetermined level, O-ring 32 contracts abruptly thereby returning displaced portions 31a inwardly from the vent grooves 18 and against the shank of the terminal member 36 to the gas-tight seal position.

It will be appreciated that fixed outer wall 22a of recess 22 serves to aid the restoration of the O-ring from its deformed shape to its normal, circular form, as the deforming forces produced by the excessive gas pressures are relieved. This restoration process is the effect of the elastic property of O-ring 32 causing the withdrawal or contraction of the previously expanded portions 31a by the cooperative action of its portions 31b which have been constrained from deformation by fixed wall 22a or recess 22 without elastic strain. Thus, when the evolved gases are released, deformed portions 31a snap back into the O-ring form.

It is thus seen that the construction of this valve assembly provides a venting valve that opens at a predetermined gas pressure, automatically closes with a snap action when the gas pressure has been reduced to a predetermined level.

For example, the valve device can be made to open at any desired gas pressure such as about 150 pounds per square inch, and to close when gas pressure falls to another level, such as about 50 pounds per square inch. The pressures mentioned are only examples and not limitations and it is to be understood that the valve can be regulated to respond to any pressures desired.

This regulation is readily accomplished in several ways. First, O-ring 32 may be made of relatively softer and thus more yieldable material, to open valve 10 at a lesser gas pressure, or of a tougher, less yieldable material to open valve 10 only when a relatively higher gas pressure is reached. Further, the thickness, i.e., the difference between the outer and inner diameter of O-ring 32 may be selected to be greater or less, resulting in a varying degree of initial protrusion above platform surface 16 prior to compression by the terminal member 36. The greater the compression, the larger will be the venting pressure. Also, the width of each of the grooves 18 may be selected to increase or decrease the effective area exposed to the ring 36. Thus, if the groove width is greater than shown in FIG. 1, the resultant larger groove space will require less gas pressure to deform the portions 31a of O-ring 32 to thereby permit the desired gas leakage. Conversely, if the width of groove 18 is less, then a greater gas pressure is needed to open valve 10. By varying these dimensions and the resilience of O-ring 32, it is seen that valve 10 may be constructed to open at any selected pressure and to close at any selected lesser pressure.

Figure 5:
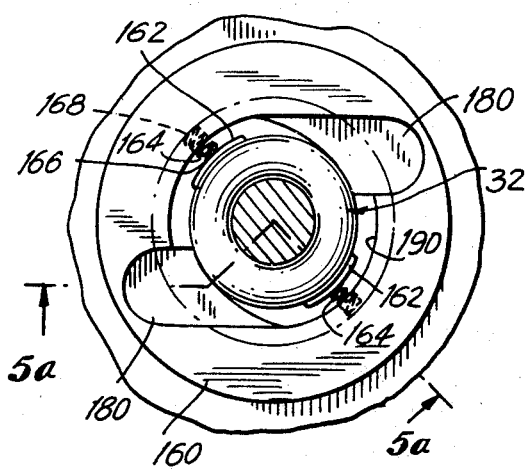
FIG. 5 is a fragmentary plan view of a modified form of the embodiment of FIG. 1.
Figure 5A:
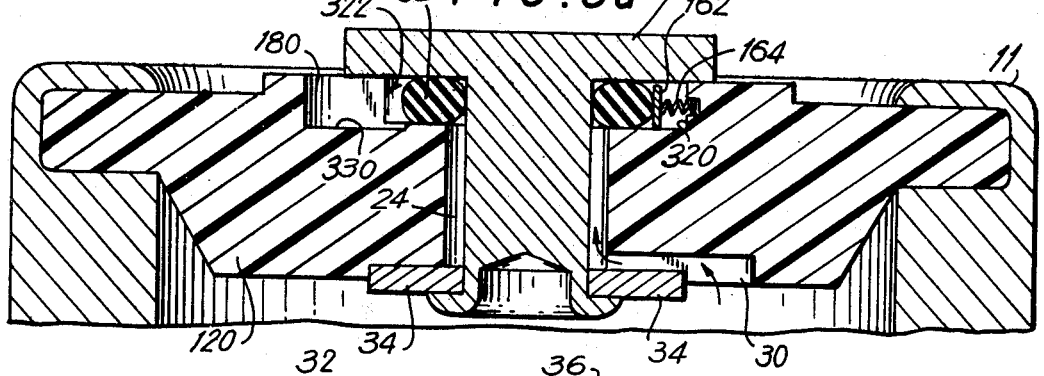
FIG. 5a is a sectional elevational view taken substantially on the line 5a—5a, of FIG. 5 depicting the low gas pressure condition.
Figure 5B:
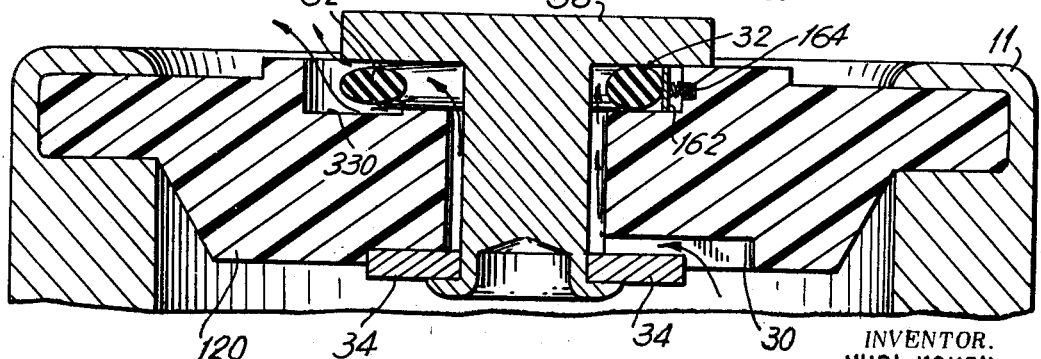
FIG. 5b is a similar sectional view as FIG. 5a but depicting the high gas pressure condition.

In a modified device, as illustrated in FIGS. 5, 5a, and 5b, I provide for a regulated expansion of the O-ring at pressures below the desired venting or relief pressure. I accomplish this by arranging the outer wall of the O-ring seat to be resilient rather than fixed as in FIG. 1. The cover 120 includes a platform 160 having grooves 180. The diameter of the seat for O-ring 32 is larger than in the first embodiment, thus providing a clearance 322 between the periphery of the O-ring and the fixed wall 320 of the seat. Two shoes 162 are resiliently spaced from the fixed wall 320 by springs 164 appropriately connected to the shoe and the wall as at points 166 and 168.

In operation, gas pressures in excess of a desired operating pressure, will produce a force on the O-ring 32 to cause it to deform substantially uniformly against the shoes 162. The O-ring 32 will thus expand within the free space 322 to an extent proportional to the spring force and the gas pressure developed. If the gas pressure is great enough, the shoes 162 will be eventually forced against wall 320, thereby preventing any further uniform expansion of the O-ring. Gas pressures in excess of that pressure will then cause the O-ring 32 to be distorted into the grooves 180, as above described in respect to FIG. 1, whereby an escape path for the gases is established.

If desired, the grooves 180 may be arranged to extend inwardly so that they release the gas before the shoes 162 reach the abutment of the fixed wall 320, whereby venting will occur during a terminal phase of the uniform expansion of the ring. Upon relief of the excess gas, or, indeed, a mere reduction of the internal gas pressure, the O-ring 32 will be quickly reseated by the expansion of spring 164 and the shoes 162 urging the ring back into its blocking position. This embodiment of the invention, it will be appreciated, will prolong the useful life of the O-ring and as has been explained gives in effect a two-step regulation of the relief-valve operation. Thus, for example, the O-ring may be arranged to expand from its seated position to the fixed wall or pressure rises from 100 to 150 p.s.i. At 150 p.s.i. and greater pressures, the O-ring will be deformed into grooves 180 thereby venting the gases until the pressure drops below 150 p.s.i.

Referring now to FIG. 6, there is shown a modified construction for additionally regulating the valve-opening and closing gas pressures. This embodiment is generally similar to that of FIGS. 1–4 but includes springs 50 disposed in each of the tangential grooves 18 to press resiliently against portions 31a of the O-ring 32 adjacent to the grooves 18. By making the springs of suitable strength, the opening and closing gas-pressure levels can be regulated; also, it is seen that the springs act as a more positive force for returning the O-ring portions to normal closed positions, as against mere contraction of the O-ring, and therefore will prolong the life of the O-ring.

FIG. 7 shows another modified arrangement for regulating the operative levels of gas pressure needed to open and close the valve. Here, this is accomplished by a terminal member 36a which is similar to member 36 of FIG. 3, except that the undersurface 36c of its head is tapered or conical rather than transverse to the shank portion. The conical contour causes additional compression of the O-ring as the terminal is being assembled, due to partial entry of the tapered portion of the head into the recess 22.

In a further embodiment of the present invention as depicted by FIGS. 8, 9, and 9a, the venting and expansion grooves 218 which are formed in platform 216 extend radially outwardly from the central bore 220 of the ring 212. The O-ring sealing member 232 is seated in the annular groove or recess 222 upon seat surface 223.

The vent grooves 218 open inwardly into the annular groove 222 and are normally disconnected by O-ring 232 from passageway 224. O-ring 232 is selected to have a thickness slightly larger than the depth of recess 222 and an inside diameter substantially equal to the diameter of the shank portion of terminal 236.

When terminal 236 is fully seated and mounted over O-ring 232, O-ring 232 will be compressed by approximately 15% to effect a gas-tight and electrolyte leakage seal over the annular opening at the upper end of passageway 224, while its segments 231a confronting the grooves 218 effectively block these grooves. As shown in FIG. 9, the relatively tight compression of ring 232 causes it to deform from its unstressed substantially circular cross-section.

As shown in FIG. 9a, as gas pressure in the galvanic cell 211 increases beyond a predetermined level, the gas pressure acts upon O-ring 232 and deforms its portions 231a which are thus gradually forced into radial grooves 118, while the remaining portions 231b remain constrained by the wall of annular recess 222 in their undistorted position.

As shown in FIG. 9a, as portions 231a expand into vent grooves 218, their cross-sectional diameter or thickness is reduced and consequently portions 231a no longer form a seal thereby allowing gas to leak past and around displaced O-ring portions 231a only into vent grooves 218 and thence into the atmosphere.

When the venting of excess gas has reduced the cell pressure to a lower predetermined level, O-ring 232 contracts, returning its displaced portions 231a inwardly from vent grooves 218 and against the shank of terminal member 236 to the gas-tight seal position.

As pointed out above with respect to the embodiment of FIG. 1, the fixed outer wall of recess 222 aids the restoration of the deformed O-ring 232 to its circular form as the excessive gas pressures are relieved. Thus, the cooperative action of constrained portions 231b and deformed portions 231a cause portions 231a to snap back to the circular O-ring form when the pressure change is rapid, and to correspondingly gradually restore when the pressure change is relatively slow. Thus, the venting valve will automatically open at a preselected gas pressure and automatically close when the gas pressure drops below a predetermined level.

As pointed out above with respect to the embodiment of FIG. 1, the gas pressure regulation may be selectively varied by varying the elasticity and/or thickness of O-ring 232, and/or varying the width of vent grooves 218.

It is understood that the modifications of FIGS. 5, 6 and 7 although depicted as applied to the embodiment of FIG. 1 are respectively equally applicable to the embodiment of FIG. 8. Thus, the regulating shoes 162 may be suitably resiliently spaced from recess wall 222, and simularly springs 50 may be disposed in each of radial grooves 218.

FIG. 10 shows a means for replenishing or introducing electrolyte into the cell, through an opening formed in any available portion of the valve body 12a or the cell casing into which a removable plug 27 is threaded, the plug head 27a overlying a gas-tight washer 27a.

Fig. 11 shows another modificaton in which, instead of the screw plug of FIG. 10, a self-sealing plug 62 is seated in the bore formed through a marginal portion of the valve body 12b, the plug 62 being enlarged at its interior end 64 to prevent dislodgement due to gas pressure. The plug is made of any suitable rubber-like material, such as synthetic rubber not affected by the electrolyte, and a hypodermic syringe and needle may penetrate it to squirt electrolyte in, the withdawal of the needle causing the minute aperture from the needle penetration to seal itself. The plugs 27 and 62 are designed to withstand internal pressures of the cell greater than the threshold pressure of the venting valve assembly. Thus, according to the invention, there is provided a venting valve regulated to relieve internal gas pressure of a galvanic cell exceeding a predetermined valve, to reseal the cell when the internal gas pressure is reduced to another predetermined but lower level and to provide access to the cell by a port to inject or introduce replenishing fluids or chemicals into the cell, which normally seals the cell against leakage therethrough for all internal pressures at least equal to the threshold pressure of the venting valve.

Although specific embodiments of the invention have been described in detailed terms, it is understood that various changes may be made in size, shape, materials and arrangement without departing from the spirit and scope of the invention as claimed.

I claim:
1. A resealable gas-venting valve assembly for containers comprising the container cover having at least one vent opening for the gases, obturator means for said openings including a member having a head portion overlaying said openings and a shank portion extending through the openings in the cover and defining between the shank and the cover at least one gas-venting passageway from said container, and resiliently deformable sealing means for said passageway; the cover having a top surface formed with an annular recess and at least one lateral groove extending from the recess, the groove having a depth at least substantially equalling that of the recess and a width exceeding the depth, the resiliently deformable sealing means being disposed in said recess and engaging resiliently at least the shank and the bottom of the recess and yieldably sealing the passageway, the sealing means having a thickness smaller than the width of the groove whereby it may be deformed, by the pressure of the gas being vented from the container, into the groove and upon release of the pressure, resiliently reengage the bottom of the recess and the shank of the member.

2. The valve assembly according to claim 1, whereby said head portion of the member applies sealing and setting forces to said resiliently deformable means.

3. The valve assembly according to claim 1, wherein the resiliently deformable sealing means is an O-ring.

4. The valve assembly according to claim 1, whereby the lateral groove extends tangentially from the recess.

5. The valve assembly according to claim 1, whereby the resiliently deformable sealing means includes spring means.

6. The valve assembly according to claim 3, wherein the recess has an outer diameter greater than that of the O-ring, forming a clearance around the O-ring beneath the head, and further comprising the resilient pressure means in the clearance bearing inwardly upon the O-ring at a location offset from the groove.

7. The valve assembly according to claim 1 wherein the groove extends generally radially outwardly beyond said head.

References Cited
UNITED STATES PATENTS 3,293,081 12/1966 Daley _____ 136—178
3,320,097 5/1967 Sugalski _____ 136—178

ALLEN B. CURTIS, Primary Examiner

D. L. WALTON, Assistant Examiner

U.S. Cl. X.R.
220—44